United States Patent
Danielsen

(10) Patent No.: US 11,879,425 B2
(45) Date of Patent: Jan. 23, 2024

(54) SYSTEM AND METHOD FOR CONTROLLING BLADE PITCH OF WIND TURBINE ROTOR BLADES IN AN IDLING STATE OF THE ROTOR HUB

(71) Applicant: General Electric Company, Schenectady, NY (US)

(72) Inventor: Darren John Danielsen, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/545,006

(22) Filed: Dec. 8, 2021

(65) Prior Publication Data
US 2023/0175489 A1 Jun. 8, 2023

(51) Int. Cl.
*F03D 7/02* (2006.01)
*F03D 17/00* (2016.01)
*F03D 7/04* (2006.01)

(52) U.S. Cl.
CPC ......... *F03D 7/0296* (2013.01); *F03D 7/0224* (2013.01); *F03D 7/042* (2013.01);
(Continued)

(58) Field of Classification Search
CPC ...... F03D 7/0296; F03D 7/0224; F03D 7/042; F03D 17/00; F03D 7/0276; F05B 2260/70;
(Continued)

(56) References Cited

U.S. PATENT DOCUMENTS 6,441,507 B1 * 8/2002 Deering ................ F03D 7/0268
 290/55
6,688,841 B1 * 2/2004 Wobben ................ F03D 7/0296
 415/1
(Continued)

FOREIGN PATENT DOCUMENTS

| WO | WO 2009/068036 A2 | 6/2009 |
| WO | WO 2010/090593 A1 | 8/2010 |
| WO | WO 2021/104597 A1 | 6/2021 |

OTHER PUBLICATIONS

EP Search Report for EP application No. 22211735.0, dated May 9, 2023, 5 pages.

*Primary Examiner* — J. Todd Newton
*Assistant Examiner* — Wayne A Lambert
(74) *Attorney, Agent, or Firm* — Dority & Manning, P.A.

(57) ABSTRACT

A proactive method prevents vibrations in one or more rotor blades of a wind turbine when the wind turbine is in a standstill idling state with a rotor hub free to rotate. The method determines a minimum revolution rate of the rotor blades that prevents vibrations of the rotor blades and that the actual revolution rate of the rotor blades is below the minimum revolution rate. A wind parameter is detected and determined to be above a threshold limit. The method also detects if grid power is available for pitching the rotor blades. Based on the wind parameter, a controller determines a pitch angle for one or more of the rotor blades to increase rotation of the blades to at least the minimum revolution rate. The controller initiates pitching the rotor blades to increase the revolution rate of the rotor blades prior to vibrations being induced in the rotor blades.

18 Claims, 7 Drawing Sheets

(52) U.S. Cl.
CPC .......... *F03D 17/00* (2016.05); *F05B 2260/70* (2013.01); *F05B 2260/96* (2013.01); *F05B 2270/32* (2013.01); *F05B 2270/321* (2013.01)

(58) Field of Classification Search
CPC .............. F05B 2260/96; F05B 2270/32; F05B 2270/321; F05B 2260/82; F05B 2270/327; Y02E 10/72
See application file for complete search history.

(56) References Cited

U.S. PATENT DOCUMENTS

| | | | |
|---|---|---|---|
| 7,854,589 B2 | 12/2010 | Nielsen et al. | |
| 8,360,723 B2* | 1/2013 | Veldkamp | F03D 7/042 416/155 |
| 8,680,700 B2* | 3/2014 | Gomez De Las Heras Carbonell | F03D 7/0224 290/44 |
| 9,371,819 B2* | 6/2016 | Grabau | F03D 7/024 |
| 10,337,495 B2* | 7/2019 | Gonzalez Castro | F03D 7/0224 |
| 11,608,812 B2* | 3/2023 | Arroyo Beltri | G01M 1/00 |
| 2006/0002793 A1* | 1/2006 | Yoshida | F03D 7/0264 416/11 |
| 2009/0246020 A1* | 10/2009 | Nielsen | F03D 13/35 416/31 |
| 2010/0133818 A1* | 6/2010 | Kinzie | F03D 7/0296 290/44 |
| 2010/0295304 A1* | 11/2010 | Rowan | F03D 7/047 290/44 |
| 2010/0301605 A1 | 12/2010 | Nielsen et al. | |
| 2014/0017079 A1* | 1/2014 | Grabau | F03D 7/042 416/37 |
| 2016/0377057 A1* | 12/2016 | Caponetti | F03D 9/25 416/1 |
| 2018/0340517 A1* | 11/2018 | Tomas | F03D 7/0264 |
| 2018/0347542 A1* | 12/2018 | Tomas | F03D 80/80 |
| 2018/0372072 A1* | 12/2018 | Danielsen | F03D 7/042 |
| 2019/0079139 A1* | 3/2019 | Melius | H01M 10/486 |
| 2019/0154001 A1* | 5/2019 | Østergaard | F03D 7/0296 |
| 2020/0025170 A1* | 1/2020 | Oing | F03D 7/042 |
| 2020/0025171 A1* | 1/2020 | Danielsen | F03D 7/0224 |
| 2020/0025174 A1* | 1/2020 | Landa | F03D 80/80 |
| 2020/0263665 A1* | 8/2020 | Dharmadhikari | F03D 7/0296 |
| 2020/0263666 A1* | 8/2020 | Pedersen | F03D 7/0224 |

\* cited by examiner

SYSTEM AND METHOD FOR CONTROLLING BLADE PITCH OF WIND TURBINE ROTOR BLADES IN AN IDLING STATE OF THE ROTOR HUB

FIELD

The present disclosure relates in general to wind turbine power generating systems, and more particularly to systems and methods for damping vibrations and loads in wind turbines, particularly when the rotor hub is in a standstill conditions with the rotor hub idling.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades, wherein the rotation generates a torque that is transmitted through a rotor shaft to a generator, either directly ("directly driven") or through the use of a gearbox. This way, the generator produces electricity which can be supplied to the electrical grid.

There is a trend to make wind turbine blades increasingly longer to capture more wind and convert the energy of the wind into electricity. This results in the blades being more flexible and more prone to aero-elastic instabilities, e.g., vibrations of the blades. Vibrating blades create risk of major potential damages in the entire wind turbine.

When the wind turbine is in operation, a wind turbine controller may operate directly or indirectly any auxiliary drive systems such as a pitch system or a yaw system to reduce loads on the blades. This way, vibrations of the blades may be counteracted. However, the problem of aero-elastic instabilities can also be serious in circumstances when the wind turbine is in stand-still conditions, either idling or locked. In this condition, edgewise oscillations are a particular concern.

At least two types of vibrations may happen during stand-still conditions. The first one is vortex induced vibration (VIV) when an angle of attack is around 90 degrees and vortices shed at frequencies close to blade eigen frequencies. The second one is stall induced vibration (SIV) when the angle of attack is close to stall angles (e.g., 15 degrees-20 degrees or other ranges depending on the wind turbine design) and the flow interaction may lead to blade vibrations. The angle of attack may be understood as a geometrical angle between a flow direction of the wind and the chord of a rotor blade.

The vortex and stall induced vibrations are phenomena that, if not adequately designed or compensated for, can lead to blade failure or accelerate blade damage.

A current solution to the cited problems includes the use of aerodynamic devices attached to the blades to reduce vortices and/or increase damping. However, this solution increases costs and time for installation and removal.

The published US Patent Application 2010/0301605 proposes a method for reducing vibrations in the rotor blades of a wind turbine when the wind turbine is in an idling state. Registration means are provided for registering an idling power producing situation of the wind turbine in relation to a utility grid, as well as detection means for detecting edgewise oscillations in one or more of the blades. Control means are used to control the pitch angle of the blades and is adapted for changing the pitch angle when the registration means registers that the wind turbine is operating in an idling power producing situation and the detection means detects edgewise oscillations in one or more of the blades. This solution, however, is reactive in nature in that corrections are not made to the pitch angle until after vibrations are actually detected in blades. These vibrations may potentially cause excessive fatigue and loads on critical components of the wind turbine, such as excessive rotor thrust and torque, individual blade loads, tower loads, and the like.

In addition, the current solutions do not consider the situation wherein grid power is unavailable to the idling wind turbine and only a limited amount (time) of power is available to yaw control system via a backup power supply.

The present disclosure provides examples of operational methods and system for wind turbines that at least partially resolve some of the aforementioned disadvantages.

BRIEF DESCRIPTION

Aspects and advantages of the invention will be set forth in part in the following description, or may be obvious from the description, or may be learned through practice of the invention.

The present disclosure encompasses a proactive method for preventing or at least reducing vibrations in one or more rotor blades of a wind turbine when the wind turbine is in a standstill idling state with a rotor hub free to rotate. The method is "proactive" in that it does not rely on detection of actual vibrations before taking corrective action but takes action prior to such vibrations being induced in the rotor blades.

The method includes determining a minimum revolution rate of the rotor blades that prevents vibrations of the rotor blades. This rate may be computed in real-time or may be predetermined at stored in an electronic lookup table that is accessed by the wind turbine controller. The method further includes determining that the revolution rate of the rotor blades is below the minimum revolution rate. One or more wind parameters for wind impacting the rotor blades are detected and the controller determines if the wind parameters are above a threshold limit. The method includes determining that grid power is available to the wind turbine and, based on the wind parameters, the controller determines a pitch angle for one or more of the rotor blades to increase rotation of the blades (i.e., the rotor hub) to at least the minimum revolution rate. This pitch angle may be computed in real-time or may be predetermined at stored in an electronic lookup table that is accessed by the wind turbine controller. The controller issues a pitch command to pitch the designated minimum number of rotor blades to the pitch angle. The rotor blades are pitched to increase the revolution rate of the rotor hub prior to vibrations being induced in the rotor blades.

In a particular embodiment, the method includes determining that yaw control is unavailable for the rotor hub prior to pitching the rotor blades. It is presumed that, if yaw control is available, the rotor hub can be yawed to a position relative to the wind to prevent blade vibrations, thereby making pitching of the blades unnecessary.

The wind parameters can vary. For example, the wind parameters, may include wind speed and wind direction, wherein the method determines that the wind speed is above a threshold speed as a prerequisite to pitching the rotor blades. Additional wind parameters, such as wind veer and wind up-flow acting on the rotor blades may also be used to determine the pitch command necessary to achieve a particular orientation of the blades relative to the wind.

Certain embodiments may include determining when grid power is not available to the wind turbine, wherein the rotor blades are pitch using a back-up power supply. In this situation, the method may further include determining (with the controller) a least number of the rotor blades to be pitched to achieve the minimum revolution rate and pitching only the least number of the rotor blades. This embodiment may include monitoring the back-up power supply to each of the rotor blades to ensure that power available to each individual rotor blade does not fall below a minimum power value (which may be the power level needed to feather the rotor blade to a windvane orientation. If a rotor blade designated as one of the minimum number of blades approaches the minimum power level, the controller may isolate the rotor blade from further pitching and designate one or more different rotor blades as the least number of rotor blades to achieve the minimum revolution rate.

The invention also encompasses another embodiment of the proactive method for preventing vibrations in one or more rotor blades when the wind turbine is in a standstill idling state with the rotor hub free to rotate. This embodiment includes determining a minimum revolution rate of the rotor blades that prevents or at least reduces vibrations of the rotor blades and determining that the revolution rate of the rotor blades is below the minimum revolution rate. One or more wind parameters for wind impacting the rotor blades are detected and determined to be above a threshold limit. If it is determined that grid power is not available to the wind turbine for pitching the rotor blades, then the method uses a back-up power supply to pitch the rotor blades. The controller a least number of the rotor blades to be pitched to achieve the minimum revolution rate and pitches only this least number of rotor blades.

The above embodiment may include monitoring the back-up power supply to each of the rotor blades to ensure that available power to each individual rotor blade does not fall below a minimum power value that may be needed to feather the blades. If a rotor blade designated as one of the minimum number of blades approaches the minimum power level, the controller may isolate the rotor blade from further pitching and designate one or more different rotor blades as the least number of rotor blades to achieve the minimum revolution rate.

The present invention also encompasses a wind turbine having a plurality of rotor blades on a rotatable rotor hub, as well as one or more sensors located to detect wind parameters of wind impacting the rotor blades. A pitch system is configured to change a pitch angle of the rotor blades and a controller is in operable communication with the pitch system. When the rotor hub in a standstill idling state and free to rotate, the controller is configured to: determine a minimum revolution rate of the rotor blades that prevents vibrations of the rotor blades; determine that the revolution rate of the rotor blades is below the minimum revolution rate; determine if one or more wind parameters for wind impacting the rotor blades are above a threshold limit; determine that grid power is available to the wind turbine; based on the wind parameters, determine a pitch angle for one or more of the rotor blades to increase rotation of the blades to at least the minimum revolution rate; issue a pitch command to the pitch control system to pitch the rotor blades to the pitch angle; and wherein the rotor blades are pitched to increase the revolution rate of the rotor blades prior to vibrations being induced in the rotor blades.

The wind turbine may include a back-up power supply for the pitch control system, wherein the controller is further configured to: determine when grid power is not available to the wind turbine; determine a least number of the rotor blades to be pitched to achieve the minimum revolution rate; and issue a pitch command to the pitch control system to pitch only the least number of the rotor blades using the back-up power supply. In this embodiment, the controller may also be configured to monitor the back-up power supply to each of the rotor blades to ensure that power available to each individual rotor blade does not fall below a minimum power value and to isolate the rotor blades from being pitched when the power available to the rotor blade reaches the minimum power level. The controller will then redesignate one or more other rotor blades as the least number of rotor blades to achieve the minimum revolution rate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
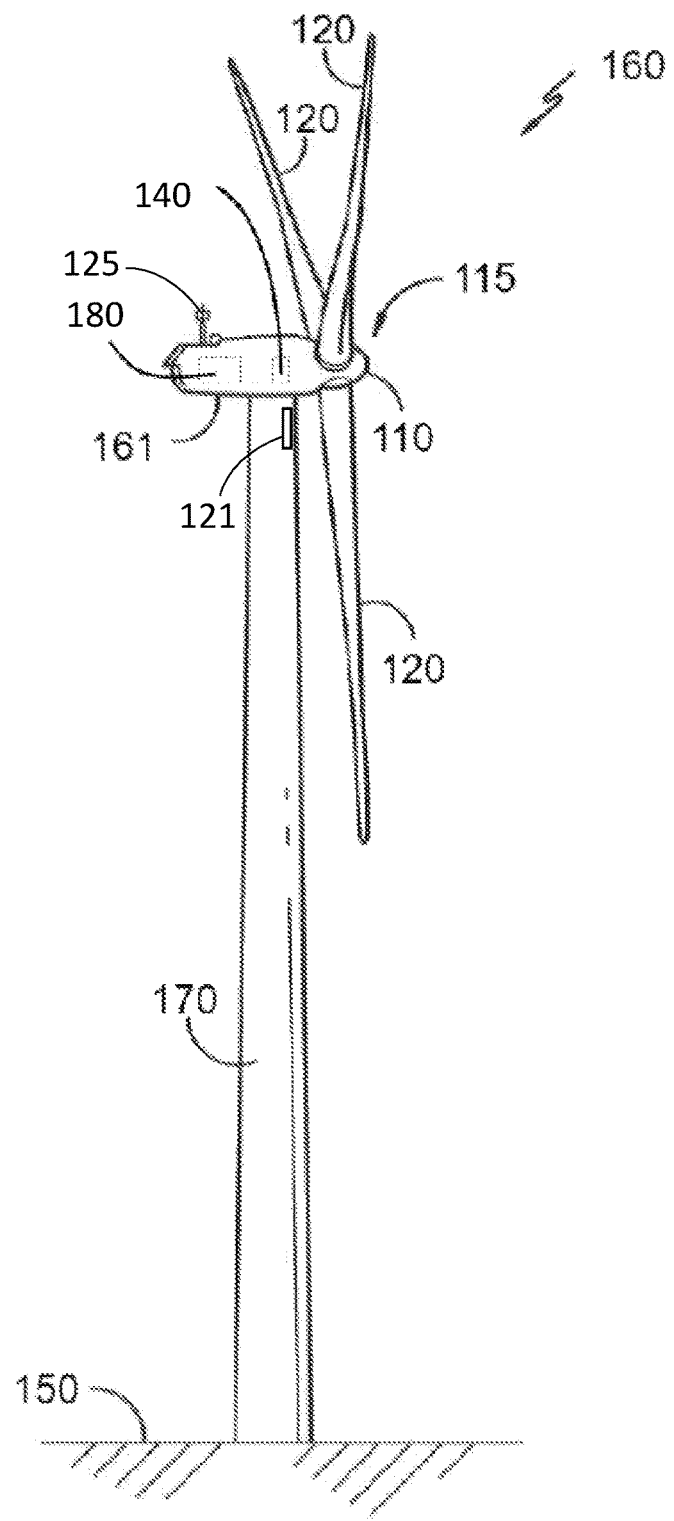
FIG. 1 is a perspective view of a wind turbine according to one example.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "controller" refers not only to integrated circuits referred to in the art as being included in a computer, but also refers to a microcontroller, a microcomputer, a programmable logic controller (PLC), an application specific integrated circuit, and other programmable circuits. The controller is also configured to compute advanced control algorithms and communicate to a variety of Ethernet or serial-based protocols (Modbus, OPC, CAN, etc.). Additionally, a memory device(s) configured with the controller may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 402, configure the controller to perform the various functions as described herein.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated example, the rotor 115 includes three rotor blades 120. However, in an alternative embodiment, the rotor 115 may include more or less than three rotor blades 120. Each rotor blade 120 is spaced from the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 or forming part of the nacelle for producing electrical energy.

The wind turbine 160 includes a wind turbine controller 180 that may be centrally located within the nacelle 161 or external to the nacelle. However, in other examples, the wind turbine controller 180 may be located within any other component of the wind turbine 160 or at a location outside the wind turbine. Further, the controller 180 may be communicatively coupled to any number of components of the wind turbine 160 in order to control the operation of such components.

For example, the controller 180 may be communicatively coupled to one or more auxiliary drive systems, such as a pitch system 107 for adjusting a blade pitch. The auxiliary drive system 107 may comprise a yaw system 20 for rotating the nacelle 161 with the respect to the tower around a rotational axis.

The present disclosure relates to situations wherein the rotor 115 is in a standstill state with the rotor hub 110 unlocked and free to rotate in an idle mode. The present disclosure contemplates that the controller 180 remains communicatively coupled to at least the pitch system 107 in the locked state of the rotor 115.

The present disclosure also contemplates that the "controller" function may also be provided by a separate dedicated controller during the locked state of the rotor, as described in the published US Patent Application 2022/0173418, which is incorporated herein in its entirety for all purposes. The dedicated controller may be configured to operate autonomously, i.e., independently from the wind turbine controller 180, at least in some operating conditions, and may be able, to perform tasks such as receiving and emitting signals and processing data when the wind turbine controller 180 is a standstill condition with the rotor 115 locked.

The wind turbine 160 of FIG. 1 may be placed in an offshore or onshore location.

The wind turbine controller (or "central control system") 180 may include one or more processor(s) and associated memory device(s) configured to perform a variety of computer-implemented functions (e.g., performing the methods, steps, calculations and the like and storing relevant data as disclosed herein). The wind turbine controller may perform various different functions, such as receiving, transmitting and/or executing wind turbine control signals and controlling the overall operation of the wind turbine. The wind turbine controller may be programmed to control the overall operation based on information received from sensors indicating e.g., loads, wind speed, wind direction, turbulence failure of a component, and others.

The wind turbine controller 180 may also include a communications module to facilitate communications between the controller 180 and the components of the wind turbine and their individual control systems (e.g., a controller for the pitch system 107, a controller for the yaw system 20, a converter control system, and other controls and components.

Further, the communications module may include a sensor interface (e.g., one or more analog-to-digital converters) to permit signals transmitted from one or more wind parameter sensors or load sensors to be converted into signals that can be understood and processed by the controller 180. It should be appreciated that the sensors may be communicatively coupled to the communications module using any suitable means as, for example, a wired connection or a wireless connection.

Figure 2:
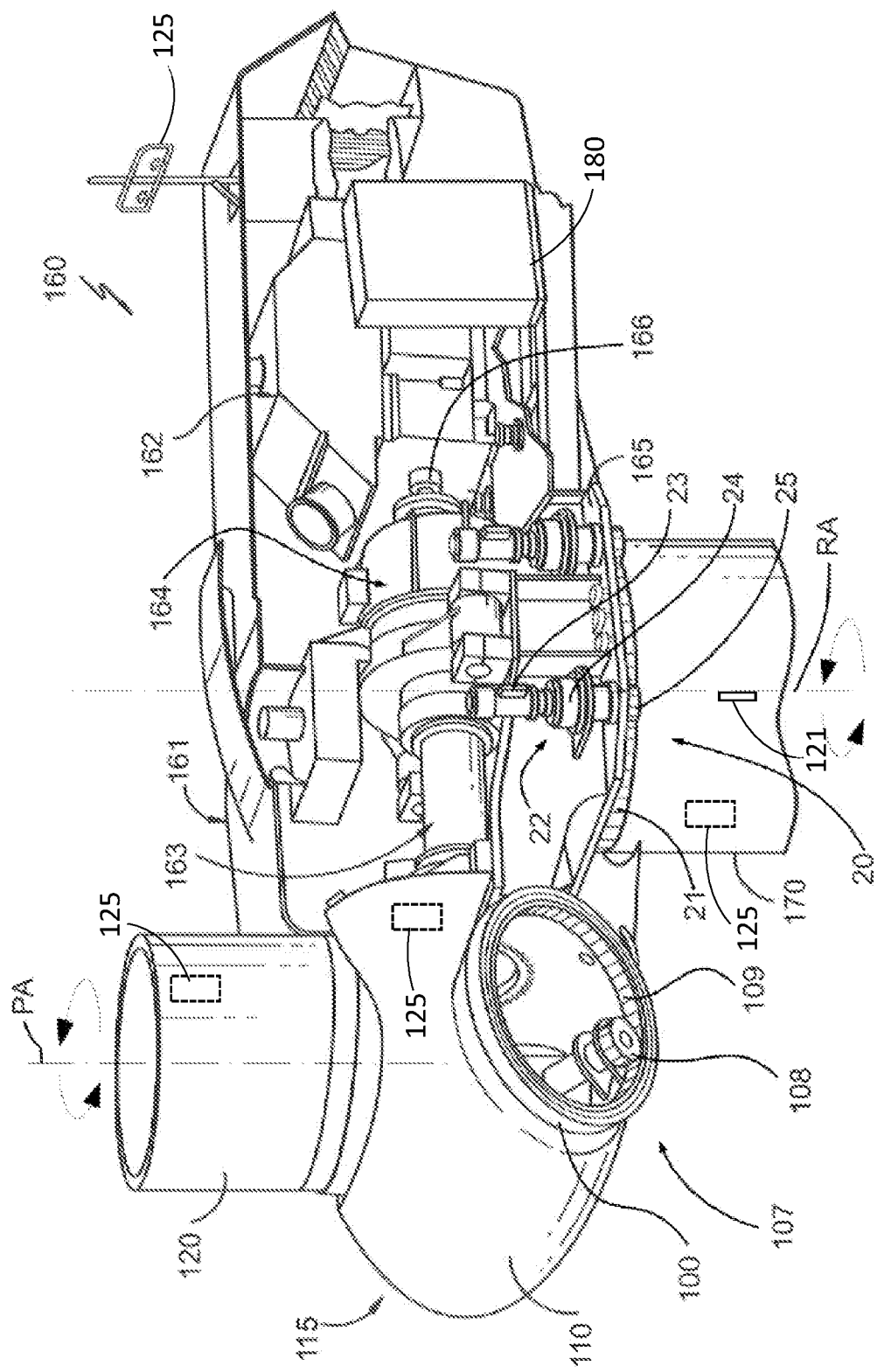
FIG. 2 is a simplified, internal view of a nacelle of a wind turbine according to one example.

FIG. 2 illustrates a simplified, internal view of one example of the nacelle 161 of the wind turbine 160 of the FIG. 1. As shown, the generator 162 may be disposed within the nacelle 161 and coupled to the rotor 115 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a rotating axis or "yaw axis" RA as depicted in FIG. 2. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

The blades 120 are coupled to the hub 110 with a pitch control system 107 that includes a pitch bearing 100 between the blade 120 and the hub 110. The pitch bearing 100 comprises an inner ring and an outer ring (shown in FIG. 2). The wind turbine blade 120 may be attached either at the inner bearing ring or at the outer bearing ring, whereas the hub 110 is connected at the other bearing ring. A blade 120 may perform a relative rotational movement with respect to the hub 110 when the pitch control system 107 is actuated. The rotational movement is performed around a pitch axis PA and thus can be measured in degrees. The inner bearing ring may therefore perform a rotational movement with respect to the outer bearing ring. The pitch control system 107 of FIG. 2 comprises a drivable pinion 108 that meshes with an annular gear 109 provided on the inner bearing ring to set the wind turbine blade 120 into rotation. Individual motors are provided for rotationally driving the pinions 108. In an operating state of the wind turbine 160 wherein the wind turbine is producing power and connected to a grid, power to drive the pitch motors is supplied from the grid or generator output.

Even though the pitch axis is shown for only a single blade 120, it should be clear that each of the blades 120 has such a pitch axis. A single pitch system or a plurality of individual pitch systems may be used to rotate the respective blades 120 around their longitudinal axes.

In the standstill idling state of the wind turbine 160 with the rotor 115 free to rotate, the wind turbine is not generating electrical power and is likely not receiving electrical power from a grid. In such instances, the wind turbine 160 further includes a dedicated power source 140 (FIG. 1), which may comprise a battery or a super-capacitor (not illustrated) that stores a predefined amount of energy to supply the controller 180 (or a dedicated controller) and the auxiliary drive system 20, 107 for a predefined period of time. In alternative examples, the dedicated power source 140 may comprise a fuel generator, such as a diesel generator. As discussed in greater detail below with respect to FIG. 3, the dedicated power source 140 may include individual power sources for each of the pitch motors.

As discussed in greater detail below, aspects of the present disclosure rely on detection of wind parameters acting on the blades 120, such as wind direction and speed. Referring to FIGS. 1 and 2, the wind turbine 10 may include one or more wind parameter sensors 125 for measuring various wind parameters upwind of the wind turbine 160. For example, as shown in FIG. 2, one sensor 125 may be located on the hub 110 so as to measure an actual wind parameter(s) upwind from the wind turbine 160. The actual wind parameter(s) may be any one or combination of the following: wind gust, wind speed, wind direction, wind acceleration, wind turbulence, wind shear, wind veer, wake, and wind up-flow. Further, the one or more sensors 125 may include at least one LIDAR sensor for measuring upwind parameters. For example, the sensor 125 in the hub 110 may be a LIDAR sensor, which is a measurement radar configured to scan an annular region around the wind turbine 160 and measure wind speed based upon reflection and/or scattering of light transmitted by the LIDAR sensor from aerosol. The cone angle ($\theta$) and the range (R) of the LIDAR sensor may be suitably selected to provide a desired accuracy of measurement as well as an acceptable sensitivity.

In further embodiments as depicted in FIG. 2, the one or more LIDAR sensors may also be located on the wind turbine tower 170, on one or more of the wind turbine blades 120, on the nacelle 161, on a meteorological mast of the wind turbine, or at any other suitable location. In still further embodiments, one or more wind parameter sensors 125 may be located in any suitable location in proximity to the wind turbine 160. The sensors 125 may be configured to measure a wind parameter ahead of at least one specific portion, typically the most significant sections of the blades 120 in terms of contributions of those sections to aerodynamic torque on the blades 120. These sections may include, for example, sections close to the tip of the blade.

In alternative embodiments, the sensors 125 need not be LIDAR sensors and may be any other suitable sensors capable of measuring wind parameters upwind of the wind turbine 160. For example, the sensors may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "determine" and variations thereof indicates that the various sensors of the wind turbine may be configured to provide a direct measurement of the parameters being monitored or an indirect measurement of such parameters. Thus, the sensors 125 may, for example, be used to generate signals relating to the parameter being monitored, which can then be utilized by the controller 180 to determine the actual wind condition.

Other aspects of the present disclosure may rely on the determination of loads acting on certain components of the wind turbine 160. Referring to FIGS. 1 and 2, load sensors 121 may be utilized for measuring a deformation of one or more of the relevant components, such as the blades 120, tower 170, bed plate, as so forth. Such sensors may be strain sensors that detect a deformation/strain parameter of the component.

In other embodiments, the loading conditions on various components of the wind turbine 160 may be indirectly determined. For example, the controller 180 (or other controller in communication with the controller 180) may receive operating data may consist of any or combination of the following: a pitch angle, a generator speed, a power output, a torque output, a temperature, a pressure, a tip speed ratio, an air density, or other similar operation condition. The controller then calculates an estimated load condition as a function of various combinations of the operating data. In one embodiment, for example, the controller may implement an estimator functionality with a control algorithm having a series of equations to determine the estimated load condition as a function of the pitch angle, the generator speed, the power output, and the air density. Further, the equations may be solved using the operating data and one or more aerodynamic performance maps. In one embodiment, the aerodynamic performance maps are dimensional or non-dimensional tables that describe rotor loading and performance (e.g., power, thrust, torque, or bending moment, or similar) under given conditions (e.g., density, wind speed, rotor speed, pitch angles, or similar). As such, the aerodynamic performance maps may include power coefficient, thrust coefficient, torque coefficient, and/or partial derivatives with respect to pitch angle, rotor speed, or tip speed ratio. Alternatively, the aerodynamic performance maps can be dimensional power, thrust, and/or torque values instead of coefficients.

Figure 3:
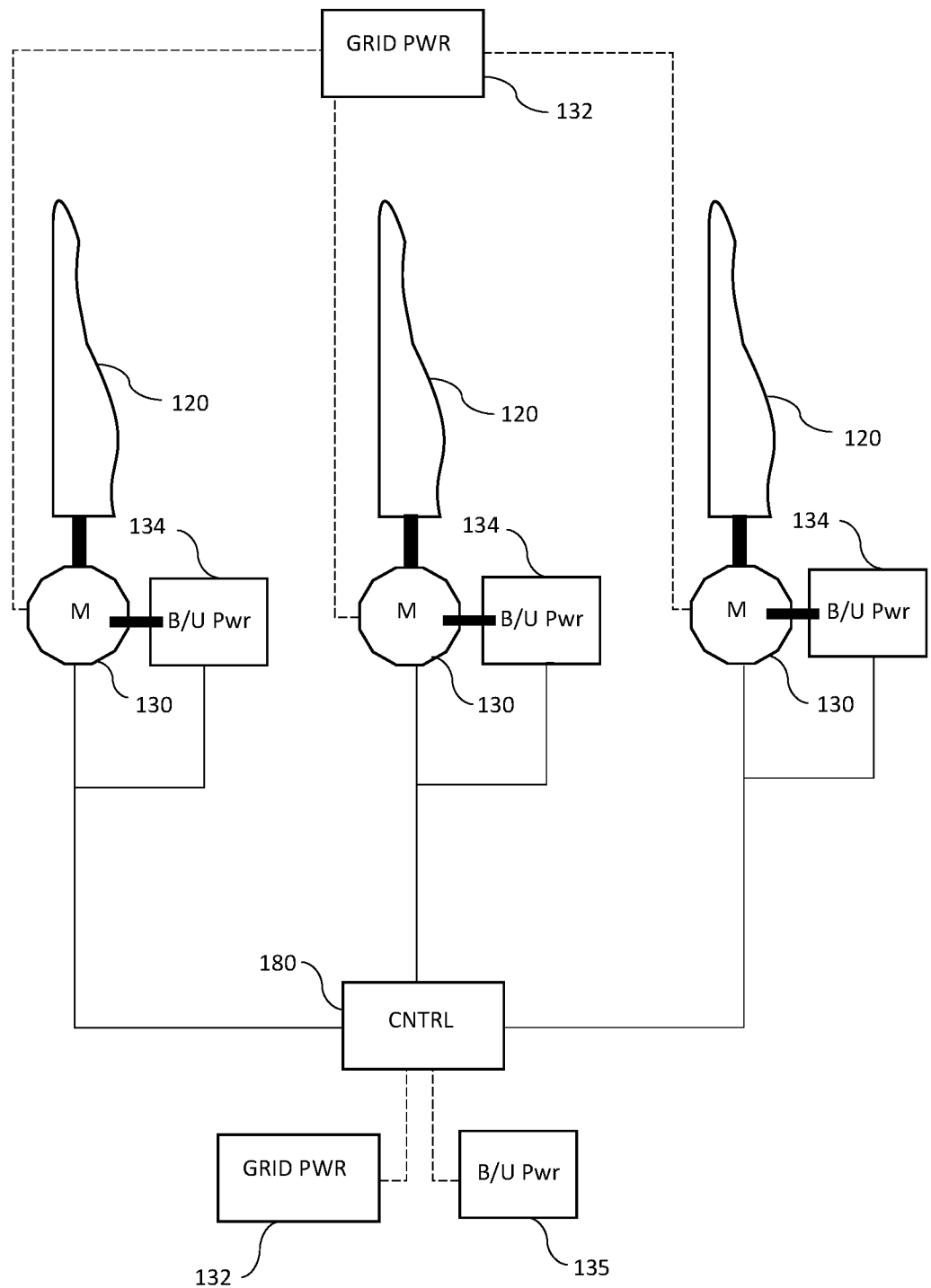
FIG. 3 is a diagram of blades of the wind turbine with associated pitch control system components.

FIG. 3 depicts a configuration of the pitch control system wherein an individual pitch motor 130 is assigned to drive the pinion 108 (FIG. 2) at each rotor blade 120. The controller 180 is in operable communication with a controller associated with each pitch motor 130. As mentioned, in an operating state of the wind turbine, power is supplied to the pitch motors 130 from grid power 132. For situations wherein grid power is not available, the backup power supply 140 (FIG. 1) is provided by an individual backup power supply 134 (such as a battery, super capacitor, diesel or gas generator, or the like) associated with each pitch motor 130. The individual backup power supplies 134 are in communication with the controller 130. A backup power supply 135 may also be provided for the controller 180.

Figure 4:
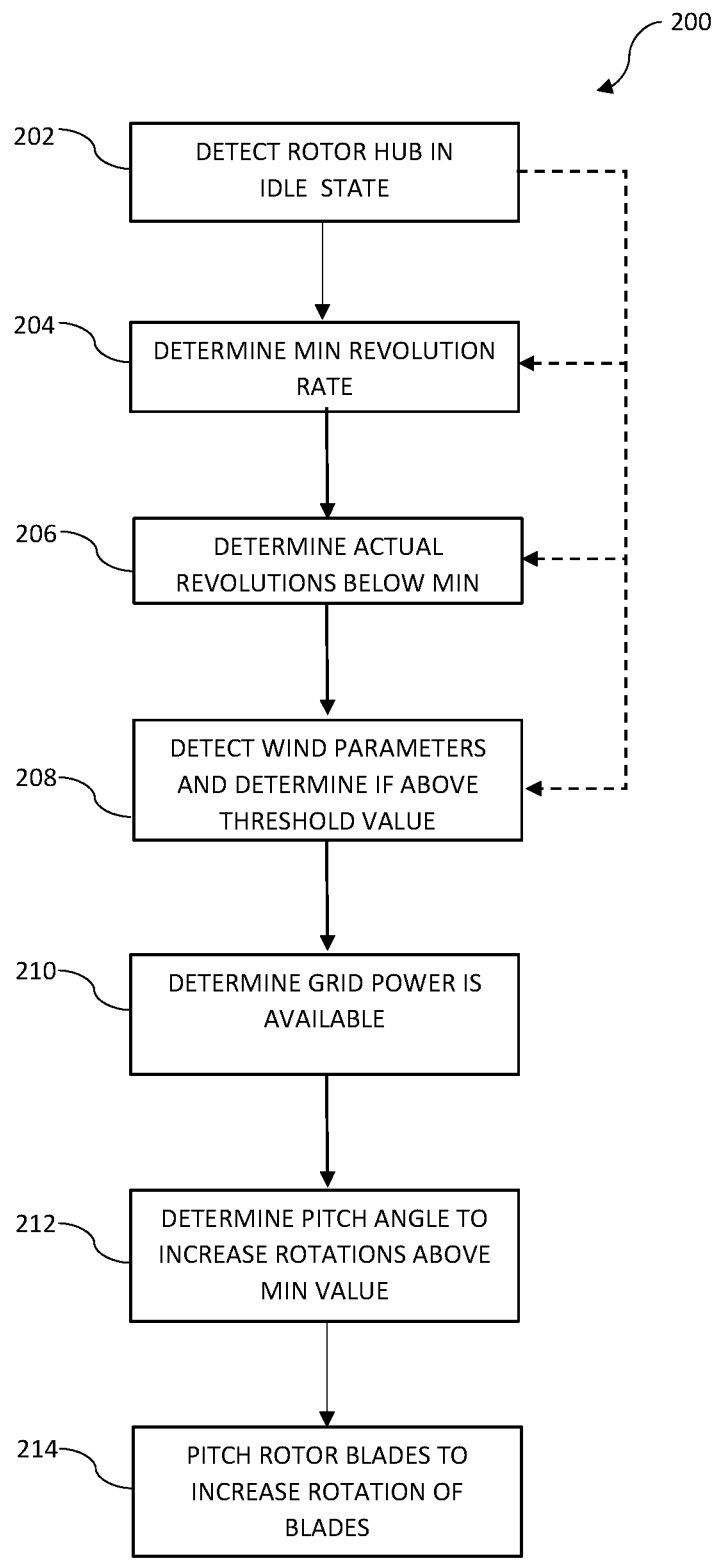
FIG. 4 is a flowchart of a method for reducing vibrations and load in rotor blades of a wind turbine according to one example.

Referring to FIG. 4, an embodiment of a method 200 in accordance with aspects of the present invention is depicted in flowchart form. At step 202, the idling state of the rotor hub is detected by the controller. Specially, it is determined that the rotor hub is not locked and is free to rotate. The dashed lines in FIG. 4 are meant to convey that this step 202 may be performed in conjunction with any number of other steps in the process.

At step 204, a minimum revolution rate of the rotor hub (and blades) that will prevent or substantially reduce vibrations being induced in the rotor blades. This revolution rate may be predetermined (e.g., empirically or via modeling) and stored in an electronic lookup table that is accessible by the controller. Alternatively, this value may be computed in real-time by the controller.

At step 206, the determination is made that the rotor hub is rotating at a rate less than the minimum revolution rate from step 204. The rotational rate of the rotor hub may be measured directly or derived from other parameters. If the revolution rate of the rotor hub is above the minimum revolution rate of step 204, then the method does not proceed further.

At step 208, one or more wind parameters of interest (e.g., wind speed) are determined via the sensors discussed above. These parameters may include, for example, any one or combination of wind direction, wind speed, wind veer, and wind up-flow. Wind veer is understood to mean wind direction variations with respect to vertical height. Wind up-flow is understood to mean an angle of the wind with respect to horizontal. Step 208 also includes a determination of whether the wind parameter(s) of interest are above a threshold value. For example, if wind speed is detected, the determination is made that the wind speed is at a value known to induce vibrations in the blades. If the wind speed is below the threshold value, then the method does not proceed further.

The dashed lines in FIG. 4 indicate that steps 202 through 208 may be carried out essentially in parallel.

At step 210, the determination is made that grid power is available for the pitch control system. If grid power is not available, then the method relies on backup power supplies, as discussed in greater detail below.

At step 212, a pitch angle is determined for the rotor blades that will generate rotations of the rotor hub above the minimum rotational rate of step 204. Since grid power is available, it may be preferable to pitch all of the blades so that each blade contributes to increased rotation of the rotor hub. Pitching less than all blades is also an option. The pitch angles for various wind parameters may be computed in real-time by the controller or may be predetermined (e.g., based on modeling or empirically determined) and stored in an electronic database (i.e., a lookup table) that is accessible by the controller. Thus, the step of determining the pitch angles includes accessing and retrieving a stored value of the pitch angle of attack for the detected wind parameters.

At step 214, the controller issues a pitch command to the rotor blades to achieve the pitch angle determined in step 212.

Figure 5:
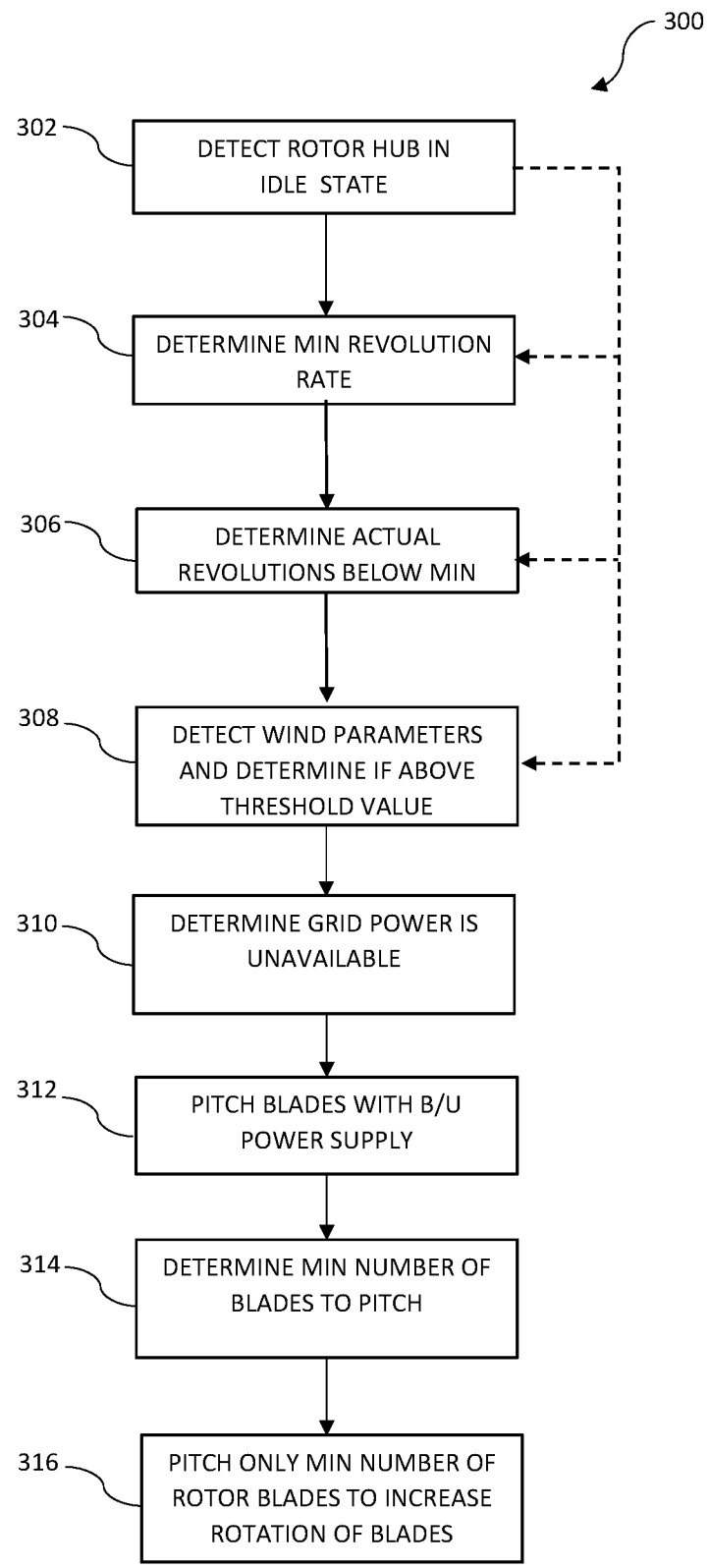
FIG. 5 is a flowchart of an alternative method for reducing vibrations and load in a rotor blades of a wind turbine.

FIG. 5 depicts an alternate method embodiment 300 in flowchart form. At step 302, the idling state of the rotor hub is detected by the controller. Specially, it is determined that the rotor hub is not locked and is free to rotate. The dashed lines in FIG. 5 are meant to convey that this step 302 may be performed in conjunction with any number of other steps in the process.

At step 304, a minimum revolution rate of the rotor hub (and blades) that will prevent or substantially reduce vibrations being induced in the rotor blades. This revolution rate may be predetermined (e.g., empirically or via modeling) and stored in an electronic lookup table that is accessible by the controller. Alternatively, this value may be computed in real-time by the controller.

At step 306, the determination is made that the rotor hub is rotating at a rate less than the minimum revolution rate from step 304. The rotational rate of the rotor hub may be measured directly or derived from other parameters. If the revolution rate of the rotor hub is above the minimum revolution rate of step 204, then the method does not proceed further.

At step 308, one or more wind parameters of interest (e.g., wind speed) are determined via the sensors 125 discussed above. These parameters may include, for example, any one or combination of wind direction, wind speed, wind veer, and wind up-flow. Wind veer is understood to mean wind direction variations with respect to vertical height. Wind up-flow is understood to mean an angle of the wind with respect to horizontal. Step 308 also includes a determination of whether the wind parameter(s) of interest are above a threshold value. For example, if wind speed is detected, the determination is made that the wind speed is at a value known to induce vibrations in the blades. If the wind speed is below the threshold value, then the method does not proceed further.

The dashed lines in FIG. 5 indicate that steps 302 through 308 may be carried out essentially in parallel.

At step 310, the determination is made that grid power is unavailable for the pitch control system. If grid power is not available, then the method relies on backup power supplies at step 312.

At step 314, the determination is made as to the minimum number of blades (and pitch angle) that need to be pitched to generate the minimum revolution rate of step 304. Because the backup power supplies are limited by capacity (and thus operational time), the goal is to preserve as much capacity from the backup power supplies as possible. For example, if only one blade can be pitched to achieve the minimum revolution rate, then the power supplies associated with the other blades can be preserved. The backup power supplies can be monitored to ensure that enough reserve remains in each supply to ensure that the respective blade can be feathered to an orientation in order to stop rotation of the rotor hub.

At step 316, only the minimum number of blades determined in step 314 are pitched to increase rotation of the rotor hub (and blades).

Figure 6A:
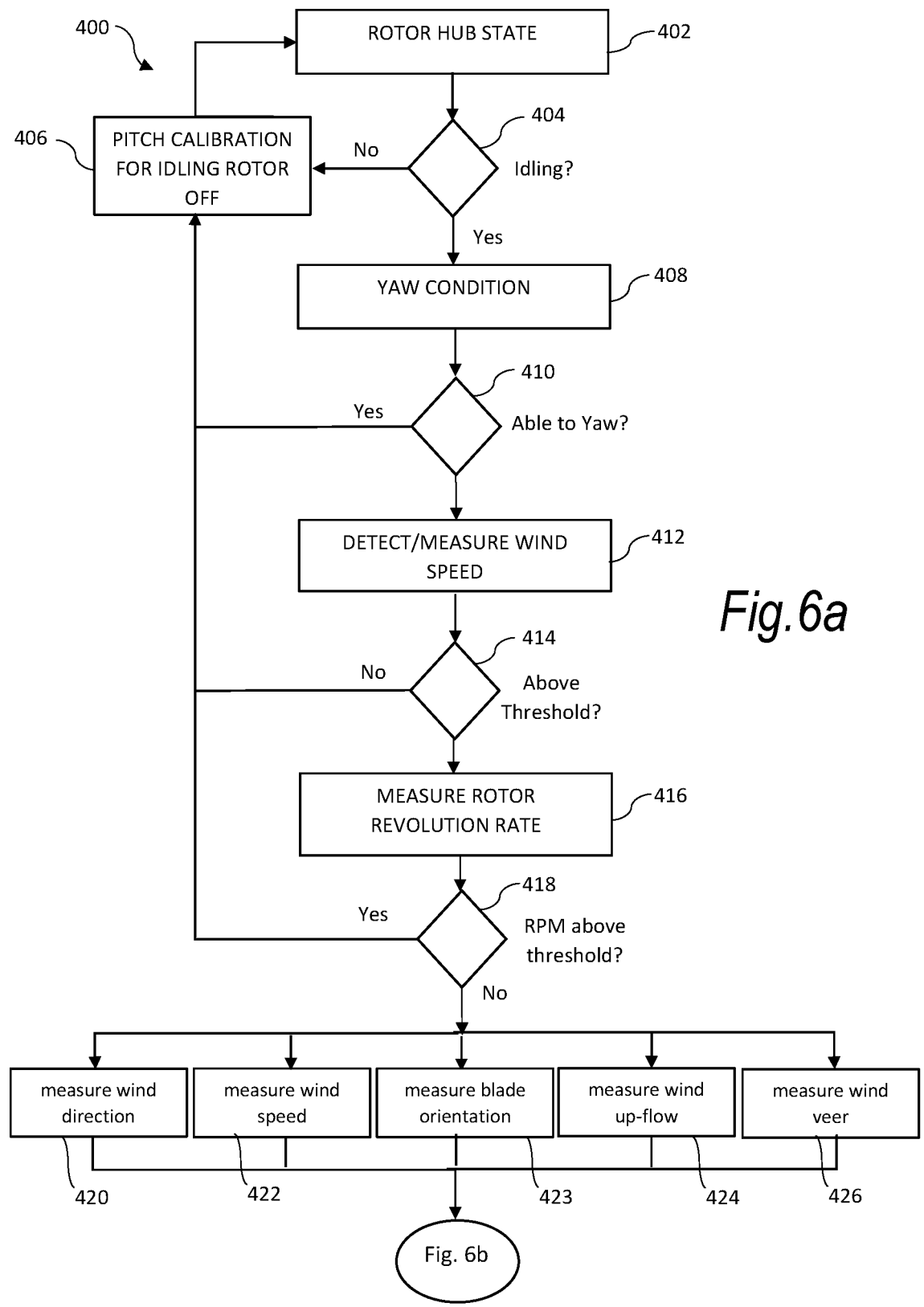
FIGS. 6a and 6b show a more detailed flowchart depicting various method embodiments according to the invention.
Figure 6B:
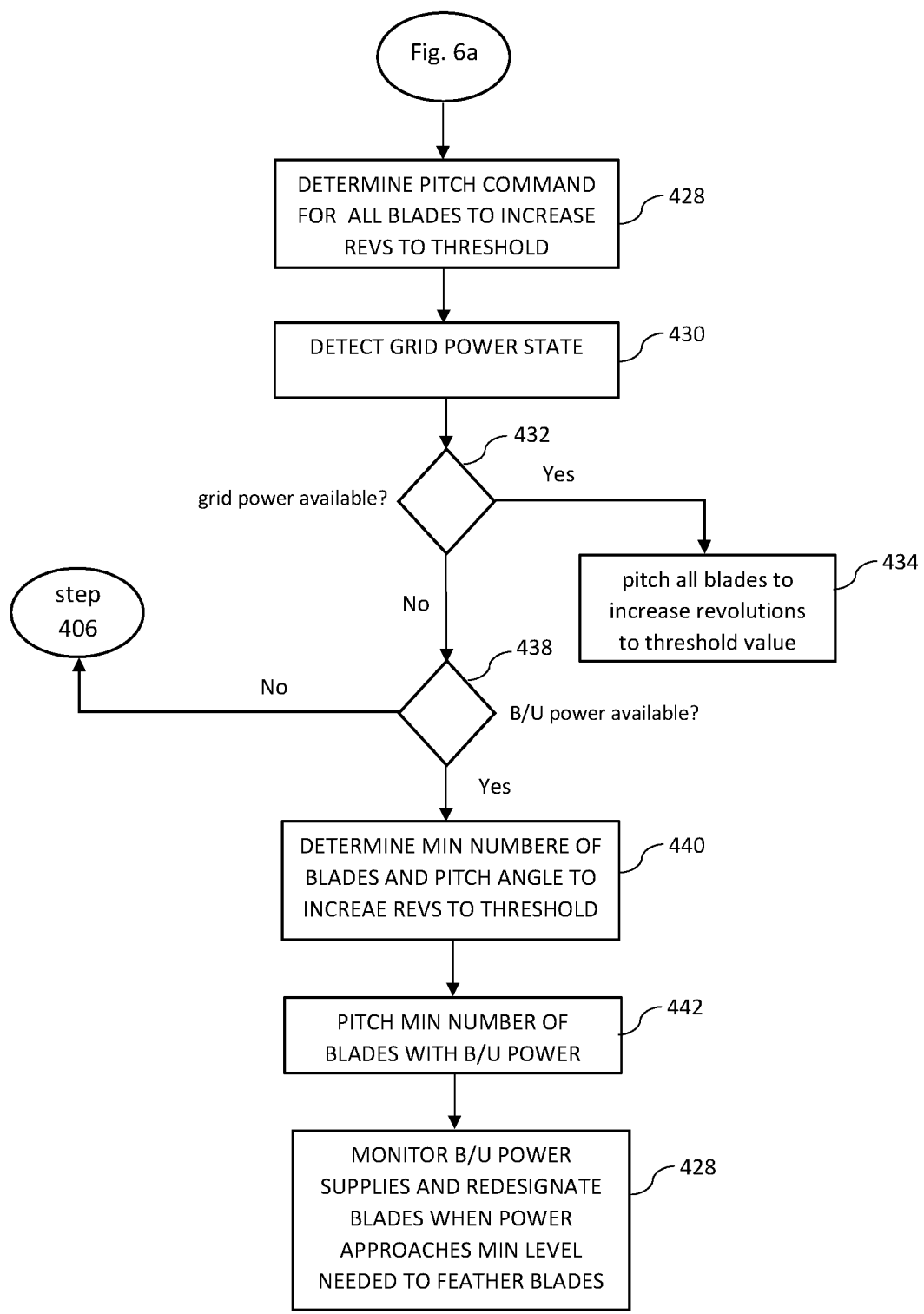

FIGS. 6a and 6b are a block diagram representing various other method embodiments. It should be appreciated that not all of the steps depicted in FIGS. 6a and 6b are necessary for any one embodiment. Various combinations of the steps depicted in FIGS. 6a and 6b are within the scope of the present disclosure.

Referring to FIG. 6a, the method 400 includes step 402 wherein an initial state of the rotor hub is detected by the controller to determine if the rotor hub is idling and free to rotate (i.e., is not locked against rotation).

At step 404, if the rotor hub is not idling, then the process proceeds directly to step 406 wherein the pitch control process is off (not activated). This condition may be present, for example, in a standstill state of the wind turbine wherein the rotor is locked.

At step 404, if it is determined by the controller that the rotor hub is idling, then the process proceeds to step 408 wherein the controller determines the yaw state of the rotor. If the rotor is able to yaw, then at step 410 the process diverts to step 406 and the pitch control process is not activated. This step may be desired when it is determined that the ability to yaw to the rotor hub provides sufficient capability to place the blades in a relative position with respect to the wind that prevents the blades from vibrating.

At step 410, if it is determined by the controller that the yaw system is non-operable, then the process proceeds to step 412 wherein the one or more wind parameters are determined, which may include one or both of wind direction and wind speed.

At step 414, the determination is made as to whether the wind parameter (e.g., wind speed) exceeds a threshold value that requires further action by the pitch control system to prevent blade vibrations. If the wind parameter does not exceed the threshold value, then corrective action is not needed and the pitch control process reverts to step 406 and is not activated.

If the wind parameter exceeds the threshold value at step 414, then the process proceeds to step 416 wherein the revolution rate of the rotor is determined by the controller.

At step 418, the determination is made as to whether the revolution rate of the rotor exceeds a defined threshold value. If it does, then the assumption is that the rotor is rotating at a sufficient rate to prevent vibrations from being induced in the blades and the process reverts to step 406 and the pitch control process ceases. If the rate does not exceed the threshold value, then the process proceeds to multiple steps 420-426, which may be performed concurrently or sequentially.

At steps 420 and 422, if not done at step 412, wind direction and wind speed are measured. Additional wind parameters may also be measured, such as wind up-flow at step 424 and wind veer at step 426.

At step 423, the orientation of the blades may be determined based on a number of factors, such as the rotor position (e.g., determined by rotor position sensors), yaw position relative to wind direction, turbine geometry (e.g., shaft tilt, cone shape, blade pre-bend, blade twist, etc.) and pitch angle. The blade orientation may be used as a consideration for determining the pitch command for an individual blade.

Referring to FIG. 6b, the process continues to step 428 wherein the controller determines a pitch command for all of the blades that is sufficient to increase the revolution rate of the rotor above the threshold value.

At step 430, the state of grid power available to the wind turbine is detected. If grid power is available at step 432 to drive the pitch motors, then the process proceeds to step 434 wherein the controller issues the pitch command to all of the blades. The blades are then pitched to increase the revolution rate of the rotor.

If grid power is not available at step 432, the process proceeds to step 438 wherein it is determined if backup power is available to pitch the blades. If backup power is not available (as well as grid power being unavailable), the process reverts to step 406 and ceases.

If backup power is available at step 438, then the process proceeds to step 440 wherein the controller determines the minimum number of blades (and pitch angle) that are need to increase revolutions of the rotor to at least the threshold value. For example, if grid power is available at step 430, then all of the rotor blades can be used. However, if grid power is not available, then it is desirable to use a minimum number (e.g., one) of the blades to preserve backup power to the other blades.

At step 442, the controller issues the pitch angle command to the minimum number of blades, which are then pitched.

At step 428, the process continues to monitor the backup power supplies for the blades, particularly for the blade that is being pitched. The intent is to ensure that sufficient power exists for a final pitch wherein the blade is feathered to a position to prevent lift. When the power supply for the blade being pitched reaches a defined minimal level, the controller will isolate this blade and redesignate one or more of the other blades for pitching.

Further aspects of the invention are provided by the subject matter of the following clauses:

Clause 1: A proactive method for preventing vibrations in one or more rotor blades of a wind turbine when the wind turbine is in a standstill idling state with a rotor hub free to rotate, the method comprising: determining a minimum revolution rate of the rotor blades that prevents vibrations of the rotor blades; determining that the revolution rate of the rotor blades is below the minimum revolution rate; detecting one or more wind parameters for wind impacting the rotor blades and determining if the wind parameters are above a threshold limit; determining that grid power is available to the wind turbine; based on the wind parameters, with a controller, determining a pitch angle for one or more of the rotor blades to increase rotation of the blades to at least the minimum revolution rate; with the controller, pitching the rotor blades to the pitch angle; and wherein the rotor blades are pitched to increase the revolution rate of the rotor blades prior to vibrations being induced in the rotor blades.

Clause 2: The proactive method according to clause 1, wherein the minimum revolution rate is predetermined, electronically stored, and accessible by the controller.

Clause 3: The proactive method according to any preceding clause, wherein the pitch angle for a plurality of combinations of the wind parameters are predetermined, electronically stored, and accessible by the controller.

Clause 4: The proactive method according to any preceding clause, further comprising determining that yaw control is unavailable for the rotor hub prior to pitching the rotor blades.

Clause 5: The proactive method according to any preceding clause, wherein the wind parameters comprise wind speed and wind direction, and further comprising determining that the wind speed is above a threshold speed as a prerequisite to pitching the rotor blades.

Clause 6: The proactive method according to any preceding clause, wherein the wind parameters further comprise one or both of wind veer and wind up-flow acting on the rotor blades.

Clause 7: The proactive method according to any preceding clause, wherein when grid power is not available to the wind turbine the rotor blades are pitched with a back-up power supply, the method further comprising: the controller determining a least number of the rotor blades to be pitched to achieve the minimum revolution rate; and pitching only the least number of the rotor blades.

Clause 8: The proactive method according to any preceding clause, further comprising monitoring the back-up power supply to each of the rotor blades to ensure that power available to each individual rotor blade does not fall below a minimum power value.

Clause 9: The proactive method according to any preceding clause, wherein when the rotor blade being pitched approaches the minimum power value, further comprising redesignating one or more different rotor blades as the least number of rotor blades to achieve the minimum revolution rate.

Clause 10: The proactive method according to any preceding clause, wherein the minimum power level corresponds to power needed to feather the rotor blade to an orientation to stop generation of lift in the blade.

Clause 11: A proactive method for preventing vibrations in one or more rotor blades of a wind turbine when the wind turbine is in a standstill idling state with a rotor hub free to rotate, the method comprising: determining a minimum revolution rate of the rotor blades that prevents vibrations of the rotor blades; determining that the revolution rate of the rotor blades is below the minimum revolution rate; detecting one or more wind parameters for wind impacting the rotor blades and determining if the wind parameters are above a threshold limit; determining that grid power is not available to the wind turbine for pitching the rotor blades; pitching the rotor blades with a back-up power supply; determining a least number of the rotor blades to be pitched to achieve the minimum revolution rate; and pitching only the least number of the rotor blades to achieve the minimum revolution rate.

Clause 12: The proactive method according to clause 11, further comprising monitoring the back-up power supply to each of the rotor blades to ensure that power to each individual rotor blade does not fall below a minimum power value.

Clause 13: The proactive method according to clause 11 or 12, wherein when the rotor blade being pitched approaches the minimum power value, redesignating one or more different rotor blades as the least number of rotor blades to be pitched to achieve the minimum revolution rate.

Clause 14: The proactive method according to any one of clauses 11-13, wherein the minimum power level corresponds to power needed to feather the rotor blade to an orientation to prevent generation of lift by the blade.

Clause 15: A wind turbine, comprising: rotor blades on a rotatable rotor hub; one or more sensors located to detect wind parameters of wind impacting the rotor blades; a pitch system configured to change a pitch angle of the rotor blades; a controller in operable communication with the pitch system; wherein with the rotor hub in a standstill idling state free to rotate, the controller is configured to: determine a minimum revolution rate of the rotor blades that prevents vibrations of the rotor blades; determine that the revolution rate of the rotor blades is below the minimum revolution rate; determine if one or more wind parameters for wind impacting the rotor blades are above a threshold limit; determine that grid power is available to the wind turbine; based on the wind parameters, determine a pitch angle for one or more of the rotor blades to increase rotation of the blades to at least the minimum revolution rate; issue a pitch command to the pitch control system to pitch the rotor blades to the pitch angle; and wherein the rotor blades are pitched to increase the revolution rate of the rotor blades prior to vibrations being induced in the rotor blades.

Clause 16: The wind turbine according to the preceding clause, further comprising a back-up power supply for the pitch control system, the controller further configured to: determine when grid power is not available to the wind turbine; determine a least number of the rotor blades to be pitched to achieve the minimum revolution rate; and issue a pitch command to the pitch control system to pitch only the least number of the rotor blades using the back-up power supply.

Clause 17: The wind turbine according to any preceding clause, wherein the controller is further configured to monitor the back-up power supply to each of the rotor blades to ensure that power available to each individual rotor blade does not fall below a minimum power value.

Clause 18: The wind turbine according to any preceding clause, wherein the controller is further configured to isolate the rotor blades from being pitched when the power available to the rotor blade reaches the minimum power level and to redesignate one or more other rotor blades to be pitched as the least number of rotor blades to achieve the minimum revolution rate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A proactive method for preventing vibrations in one or more rotor blades of a wind turbine when the wind turbine is in a standstill idling state with a rotor hub free to rotate, the method comprising:
    determining a minimum revolution rate of the rotor blades that prevents vibrations of the rotor blades;
    determining that the revolution rate of the rotor blades is below the minimum revolution rate;
    detecting one or more wind parameters for wind impacting the rotor blades and determining if the wind parameters are above a threshold limit;
    determining that grid power is available to the wind turbine;
    based on the wind parameters, with a controller, determining a pitch angle for one or more of the rotor blades to increase rotation of the blades to at least the minimum revolution rate;
    with the controller, pitching the rotor blades to the pitch angle; and
    wherein the rotor blades are pitched to increase the revolution rate of the rotor blades prior to vibrations being induced in the rotor blades.

2. The proactive method according to claim 1, wherein the minimum revolution rate is predetermined, electronically stored, and accessible by the controller.

3. The proactive method according to claim 1, wherein the pitch angle for a plurality of combinations of the wind parameters are predetermined, electronically stored, and accessible by the controller.

4. The proactive method according to claim 1, further comprising determining that yaw control is unavailable for the rotor hub prior to pitching the rotor blades.

5. The proactive method according to claim 1, wherein the wind parameters comprise wind speed and wind direction, and further comprising determining that the wind speed is above a threshold speed as a prerequisite to pitching the rotor blades.

6. The proactive method according to claim 5, wherein the wind parameters further comprise one or both of wind veer and wind up-flow acting on the rotor blades.

7. The proactive method according to claim 1, wherein when grid power is not available to the wind turbine the rotor blades are pitched with a back-up power supply, the method further comprising:
    the controller determining a least number of the rotor blades to be pitched to achieve the minimum revolution rate; and
    pitching only the least number of the rotor blades.

8. The proactive method according to claim 7, further comprising monitoring the back-up power supply to each of the rotor blades to ensure that power available to each individual rotor blade does not fall below a minimum power value.

9. The proactive method according to claim 8, wherein when the rotor blade being pitched approaches the minimum power value, further comprising redesignating one or more different rotor blades as the least number of rotor blades to achieve the minimum revolution rate.

10. The proactive method according to claim 8, wherein the minimum power value corresponds to power needed to feather the rotor blade to a feathered orientation that prevents generation of lift by the rotor blade.

11. A proactive method for preventing vibrations in one or more rotor blades of a wind turbine when the wind turbine is in a standstill idling state with a rotor hub free to rotate, the method comprising:
  determining a minimum revolution rate of the rotor blades that prevents vibrations of the rotor blades;
  determining that the revolution rate of the rotor blades is below the minimum revolution rate;
  detecting one or more wind parameters for wind impacting the rotor blades and determining if the wind parameters are above a threshold limit;
  determining that grid power is not available to the wind turbine for pitching the rotor blades;
  pitching the rotor blades with a back-up power supply;
  determining a least number of the rotor blades to be pitched to achieve the minimum revolution rate; and
  pitching only the least number of the rotor blades to achieve the minimum revolution rate.

12. The proactive method according to claim 11, further comprising monitoring the back-up power supply to each of the rotor blades to ensure that power to each individual rotor blade does not fall below a minimum power value.

13. The proactive method according to claim 12, wherein when the rotor blade being pitched approaches the minimum power value, redesignating one or more different rotor blades as the least number of rotor blades to be pitched to achieve the minimum revolution rate.

14. The proactive method according to claim 12, wherein the minimum power value corresponds to power needed to feather the rotor blade to a feathered orientation that prevents generation of lift by the blade.

15. A wind turbine, comprising:
  rotor blades on a rotatable rotor hub;
  one or more sensors located to detect wind parameters of wind impacting the rotor blades;
  a pitch system configured to change a pitch angle of the rotor blades;
  a controller in operable communication with the pitch system;
  wherein with the rotor hub in a standstill idling state free to rotate, the controller is configured to:
    determine a minimum revolution rate of the rotor blades that prevents vibrations of the rotor blades;
    determine that the revolution rate of the rotor blades is below the minimum revolution rate;
    determine if one or more wind parameters for wind impacting the rotor blades are above a threshold limit;
    determine that grid power is available to the wind turbine;
    based on the wind parameters, determine a pitch angle for one or more of the rotor blades to increase rotation of the blades to at least the minimum revolution rate;
    issue a pitch command to the pitch control system to pitch the rotor blades to the pitch angle; and
    wherein the rotor blades are pitched to increase the revolution rate of the rotor blades prior to vibrations being induced in the rotor blades.

16. The wind turbine according to claim 15, further comprising a back-up power supply for the pitch control system, the controller further configured to:
  determine when grid power is not available to the wind turbine;
  determine a least number of the rotor blades to be pitched to achieve the minimum revolution rate; and
  issue a pitch command to the pitch control system to pitch only the least number of the rotor blades using the back-up power supply.

17. The wind turbine according to claim 16, wherein the controller is further configured to monitor the back-up power supply to each of the rotor blades to ensure that power available to each individual rotor blade does not fall below a minimum power value.

18. The wind turbine according to claim 17, wherein the controller is further configured to isolate the rotor blades from being pitched when the power available to the rotor blade reaches the minimum power value and to redesignate one or more other rotor blades to be pitched as the least number of rotor blades to achieve the minimum revolution rate.

* * * * *